United States Patent [19]

Swegen et al.

[11] Patent Number: 5,047,613
[45] Date of Patent: Sep. 10, 1991

[54] ARRANGEMENT FOR DISPENSING BANK NOTES AND GOODS

[75] Inventors: Hans B. A. Swegen, Farsta; Jan Westlund, Åkersberga, both of Sweden

[73] Assignee: Inter Innovation AB, Stockholm, Sweden

[21] Appl. No.: 327,612

[22] Filed: Mar. 23, 1989

[30] Foreign Application Priority Data

Apr. 8, 1988 [SE] Sweden .............................. 8801296

[51] Int. Cl.[5] ............................................ G06F 15/30
[52] U.S. Cl. .................................... 235/379; 235/381; 902/10
[58] Field of Search ....................... 235/379, 380, 381; 902/10

[56] References Cited

U.S. PATENT DOCUMENTS 3,949,364  4/1976  Clark ....................................... 902/10
4,395,627  7/1983  Barker ................................... 238/380
4,650,977  3/1987  Couch .................................... 235/381

Primary Examiner—Harold Pitts
Attorney, Agent, or Firm—Simmons, Perrine, Albright & Ellwood

[57] ABSTRACT

An arrangement for dispensing bank notes includes card reader (15), first keyboard (11) and second keyboard (12). The card reader, the two keyboards and the requisite electronics are incorporated in a control panel (10) which is common to a cash dispenser (1) and to a goods vending machine (19) and which is intended for the initiation of a process for dispensing bank notes from the cash dispenser and/or a process for the purchase of goods from the vending machine.

A third keyboard (13) having at least two buttons (131,-132) is provided for the initiation of the bank-note dispensing process or the goods vending process, wherein depression of a first button (131) of the two buttons will cause the first keyboard (11) to show different numbers of bank notes or bank-note values on the buttons of the keyboard, whereas depression of a second button (132) will cause the keyboard (11) to show on the buttons thereof different qualities of goods.

15 Claims, 2 Drawing Sheets

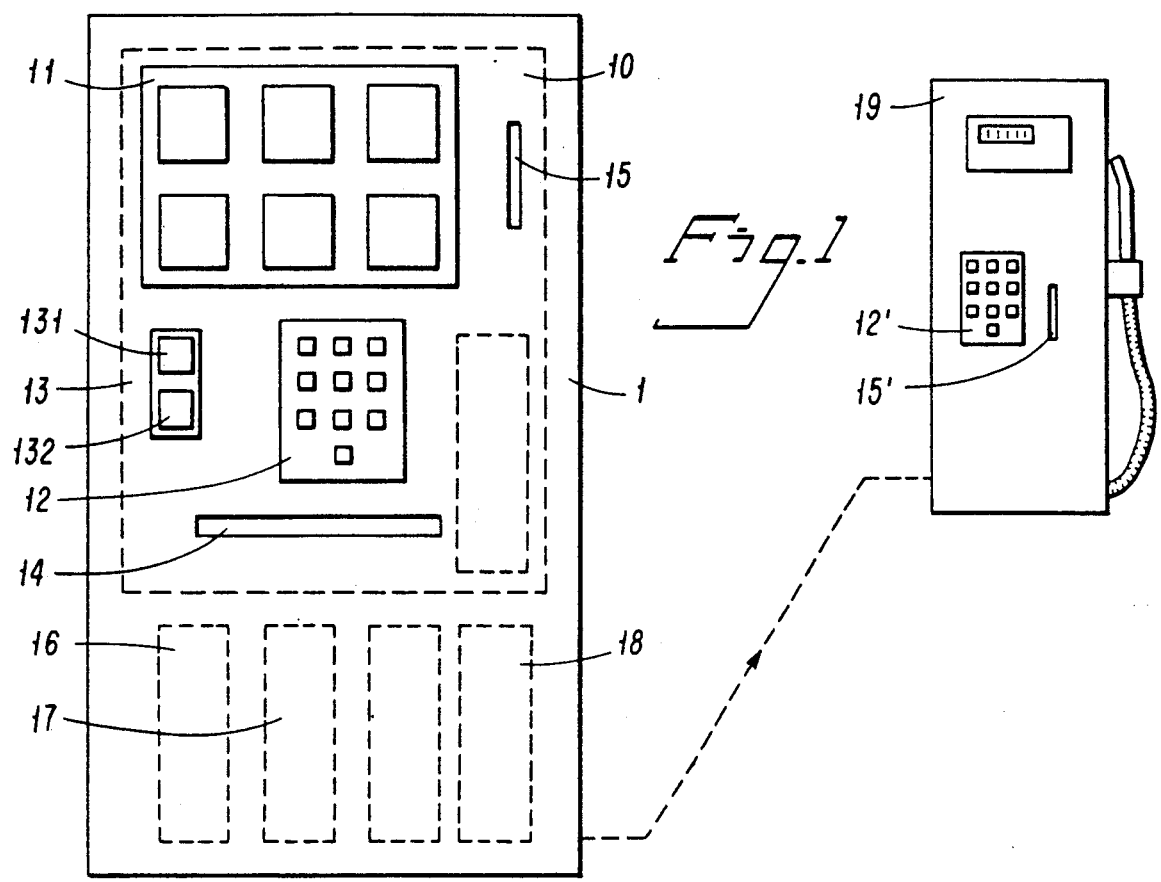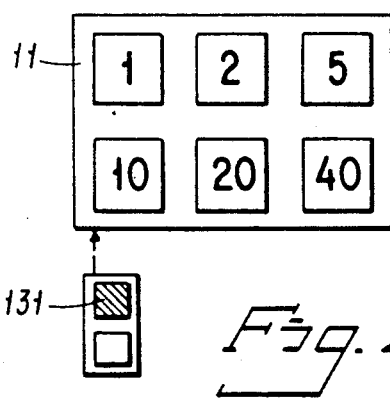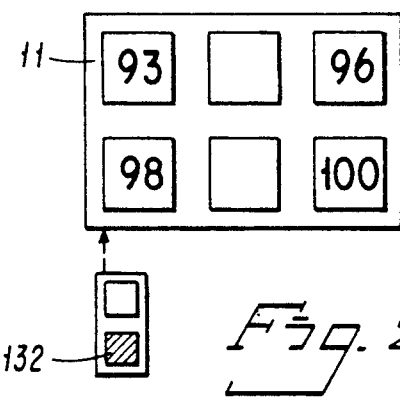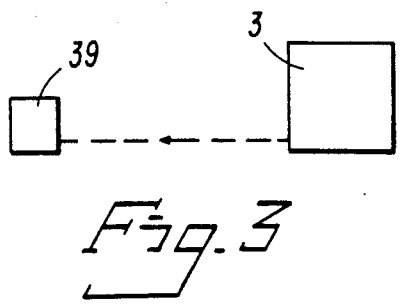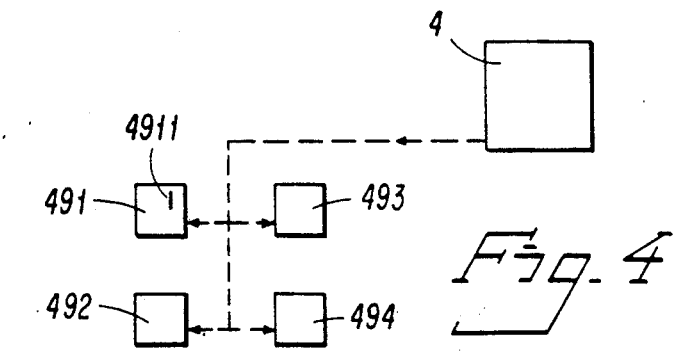

ARRANGEMENT FOR DISPENSING BANK NOTES AND GOODS

TECHNICAL FIELD

The present invention relates to an arrangement for dispensing bank notes and goods. More specically, but not exclusively, the invention relates to an arrangement for dispensing bank notes from a store of bank notes to a receipt opening which is accessible to a customer, said an arrangement including a card reader, a first keyboard by means of which the number of bank notes desired or the value of said bank notes can be inserted into the arrangement and a second keyboard for the insertion of an individual code.

BACKGROUND PRIOR ART

The use of an arrangement which includes a first keyboard through which a desired number of bank notes or the value of said bank notes are inserted and a second keyboard by means of which an individual code is inserted, for the purpose of dispensing bank notes from a store thereof to a receipt opening which is available to a customer, is previously known U.S. Pat. No. 4,430,562.

It is also known to the art to utilize vending machines for the purchase of goods, e.g. petrol or gasoline from pumps which are programmed to dispense gasoline subsequent to payment of the price stipulated by insertion of cash, in bank note form, or for the purchase of such goods as chocolate bars, milk, soft drinks, and the like, by inserting coins to the value stipulated in respect of each item purchased into coin slots intended herefor.

The object of the present invention is one of rationalizing activities in conjunction with drawing money from cash points and the purchase of goods from vending machines, in a conventional and time-saving fashion, all to the benefit of both customer and proprietor.

SUMMARY OF THE INVENTION

According to the invention, in the case of an an arrangement of the aforesaid kind, comprising a first and a second keyboard, the card reader, the first and the second keyboards and the requisite electronics are housed in a customer-operated control panel which is common to both facilities, i.e. cash dispensing facility and a goods vending facility. This control panel is effective in initiating a cash dispensing process and/or a process for the purchase goods in response to the manner in which the customer uses the control panel.

These and other characteristics of the inventive arrangement are set forth in the following claims.

BRIEF DESCRIPTION OF THE DRAWINGS

The invention will now be described in more detail with reference to the accompanying drawings, in which FIG. 1 illustrates an arrangement which is equipped with a control panel and which is a combination of both cash dispenser and vending machine (gasoline pump)

FIG. 2a illustrates a first and a third keyboard incorporated in the control panel and being in a cash dispensing mode, FIG. 2b is a view similar to FIG. 2a, but shows the arrangement in its goods vending mode (filling up with gasoline), FIG. 3 illustrates a cash dispenser and a co-acting vending machine located at a substantial distance from the cash dispenser, FIG. 4 illustrates a cash dispenser with four vending machines positioned at a substantial distance from the dispenser.

DESCRIPTION OF PREFERRED EMBODIMENTS

Figure 5:
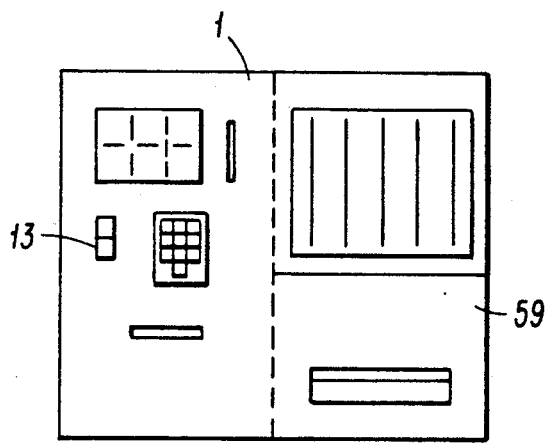
FIG. 5 illustrates an an arrangement which incorporates both cash dispenser and vending machine facilities.

The arrangement illustrated in FIG. 1 includes a cash dispenser 1 and a goods vending machine 19, in this instance a gasoline pump.

The dispenser is equipped with a control panel 10 which includes a first keyboard 11, a second keyboard 12, a third keyboard 13 which has two buttons 131, 132, a card reader 15, a bank note delivery opening 14, and the requisite electronics for controlling the various units. Bank notes are stored in cassettes 16, 17–18, from where they are fed to the opening, subsequent to manipulation of the keyboards in a manner commensurate with the programming thereof.

The vending machine 19 is connected to the control panel 10 of the cash dispenser by means of an operating line and has a second keyboard 12' and card reader 15' respectively of the same kind as the keyboard 12 and card reader 15 in the cash dispenser.

The schematically illustrated arrangement decribed above has the following intended modus operandi.

When a customer, e.g. a motorist, approaches the cash dispenser, the keyboard 11 lacks information or, if equipped with a visual display screen, displays the words "select CASH or GASOLINE" and optionally also an arrow which points to the keyboard 13. If the customer wishes to draw out cash, he/she presses the button 131, wherewith the first keyboard will reveal the numerals 1, 2, 5, 10, 20, 40 on the six large buttons of the keyboard 11 and on the six pictures of buttons shown on the screen, see FIG. 2a. These buttons denote the value of the bank notes desired, or the sum to be withdrawn. For instance, if the customer wishes to withdraw SEK 500, he will press the button (the picture) which bears the number 5. Alternatively, he may press buttons (the pictures) bearing the numerals, e.g., 100, 200, 1000, 2000, and 4000, corresponding to similar sums in Swedish crowns.

When the customer has selected the number of bank notes required, the sum in cash, and has pressed the buttons concerned, he inserts his identification card, or cash card, into the card reader 15 and enters his individual code number on the second keyboard 12. Such text as "INSERT CARD" and "INSERT CODE" is automatically displayed on the screen, together with pictures of arrows which point to the card reader 15 and the second keyboard 12 respectively. A bundle of bank notes corresponding to the sum entered will normally be delivered to the customer receipt opening 14 some few seconds after having inserted the last digit of the code, assuming, of course, that the customer is entitled to the sum requested. This terminates the cash dispensing process.

When the customer wishes to fill up his gasoline tank, instead of, or in addition, to withdrawing a cash sum, he presses the lower button 132, whereupon the first keyboard will show, for instance, the numerical sequence 93, 96, 98, 100 on its buttons and on the screen, see FIG. 2b. For instance, if the customer requires 98-octane gasoline, he presses the corresponding button (picture) bearing the number 98. As previously mentioned, the customer then inserts his card into the card reader 15 and punches his personal code into the second keyboard 12. If the customer is entitled to purchase gasoline in this way, he will be given "the go ahead", for instance in the form of a green flashing light, whereafter he moves his vehicle to the gasoline pump 19, inserts his card into the card reader 15' and also his code into the keyboard 12'. The customer can then fill his gasoline tank with the desired quantity of 98-octane gasoline, the monetary withdrawal being recorded and debited in a conventional manner. The gasoline purchasing procedure is therewith terminated.

FIG. 3 illustrates schematically an arrangement which includes a free-standing transaction unit 3 which incorporates a control panel, energy source, etc., and a vending machine 39, in this case a gasoline pump, which is located some considerable distance from the unit 3, but is in signal contact with said unit. The unit 3 may include a cash dispenser and optionally also a goods vending facility, e.g. may offer for sale such goods as fruit, bread, beer, water, in which case the third keyboard 13 will include more buttons, e.g. a first button 131 for cash withdrawal purposes, a second button 132 for the purchase of gasoline and a third button for the purchase of foodstuffs. Customers who Wish to purchase foodstuffs are required to press the third button, whereupon the first keyboard 11 will show pictures of various foodstuffs and/or corresponding text, e.g. the aforementioned six items of foodstuff. The customer is then expected to press the button(s), (pictures) for the goods he or she wishes to purchase—the same button is pressed several times, if the customer wishes to obtain a multiple of one and the same item—, whereafter the customer will insert his or her card and the requisite code, as before described. The purchase is recorded (debited) in a conventional manner and the items concerned are dispensed or are made available for removal from an adjacent compartment(s).

FIG. 4 illustrates schematically an arrangement which includes a free-standing transaction unit 4 with cash dispenser, and four vending machines (gasoline pumps) 491–494 which are spaced some considerable distance from the unit 4, but in signal contact therewith.

In principle, this arrangement may be constructed similarly to the arrangement illustrated in FIG. 3, wherewith the pumps 491–494 may dispense 93, 96, 98 and 100 octane gasoline respectively.

Also conceivable is the variant where the customer wishes to purchase through the control panel a short-term purchasing card which will enable him/her to purchase gasoline from a given pump over a limited period of time. This transaction is accordingly programmed into the corresponding electonics, such as to accept the card for gasoline-purchasing purposes for the given time period requested.

FIG. 5 illustrates schematically an arrangement which comprises a combined transaction unit/cash dispenser 1 and foodstuff vending machine 59. The choice of machine is made through the third keyboard 13, in the aforedescribed manner.

Figure 6:
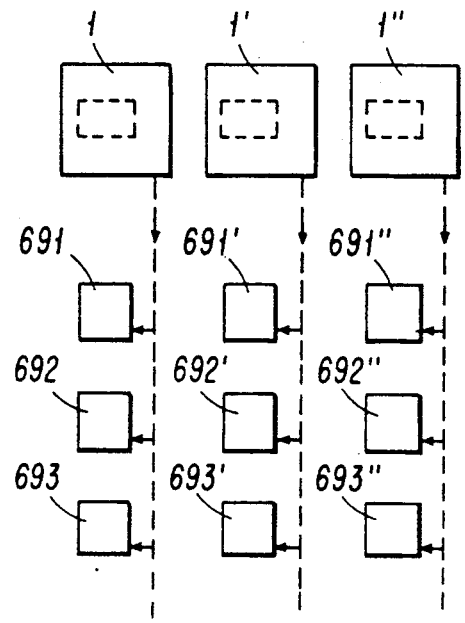
FIG. 6 illustrates three cash dispensers each with an individual control panel and three vending machines for each of the cash dispensers.

FIG. 6 illustrates schematically an arrangement which comprises three transaction units 1, 1' 1" each having an individual control panel and an individual cash dispenser. Each unit operates in conjunction with a respective row of vending machines, namely vendors 691, 692, 693, in respect of the unit 1, vendors 691', 692', 693', in respect of the unit 1", and vendors 691", 692", 693", in respect of the unit 1", Each row of vending machines, which may consist of gasoline pumps or foodstuff vendors, is connected signal-wise to respective transaction units.

This arrangement enables expensive electronic equipment to the incorporated in the units 1, 1', 1", while allowing the vending machines 691-693" to be given a much simpler construction and to be made more robust.

Figure 7:
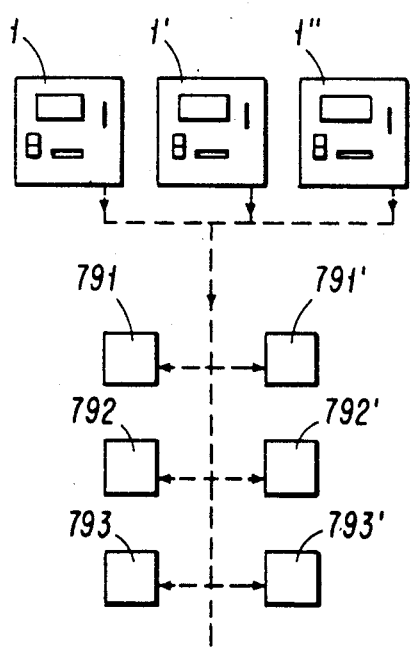
FIG. 7 illustrates three cash dispensers each having an individual control panel, and two rows of vending machines with each row being common to all cash dispensers.

FIG. 7 illustrates schematically an arrangement which comprises three transaction units/ cash dispensers 1, 1', 1", and two rows of vending machines 791-793 and 791'-793' respectively. All of the units 1-1' are connected signal-wise to the vending machines 791-793' and may be constructed so that a customer can use any one of the machines whatsoever or solely one given machine, which will then be programmed in the manner described with reference to FIG. 4.

Figure 8:
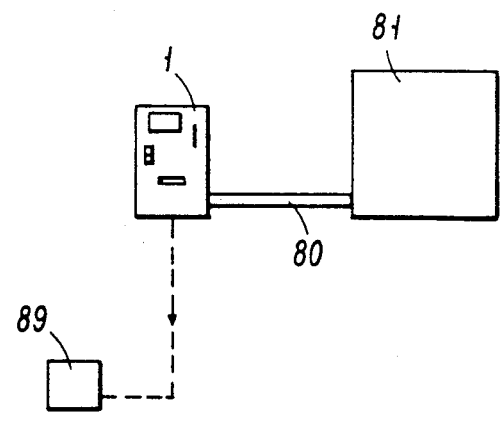
FIG. 8 illustrates a free-standing cash dispenser connected to tube dispatch system of cooperating with a bank, and free standing vending machine.

FIG. 8 illustrates schematically an arrangement which comprises a free-standing transaction unit 1 with cash dispenser. The unit is connected to a bank location 81, by means of a tube system 80 and is connected signalwise to a free-standing vending machine 89. The bank location will thus have personnel for manually effecting transactions, and said location may also include a facility for supplying goods to the unit 1. In principle, the handling of bank notes and goods in the location 81 may also be automated, so that cash and goods can be obtained automatically from the location 81 twenty four hours a day, by appropriate manipulation of the panel on the unit 1. Combined dispensers for both cash and goods and incorporating a multiple of receipt openings are previously known to the art; see in this respect U.S. Pat. No. 4,343,582. One such dispenser may be provided with a receipt opening for the bank official, in the case of manually effected transactions in a bank location, and a receipt opening which is coupled to the tube system 80 for automatic dispensing of cash to the unit 1, subsequent to appropriate manipulation of the control panel belonging to this unit. Goods can be delivered automatically from the location 81 in a corresponding manner.

It will be understood that the invention is not restricted to the described and illustrated embodiments thereof and that modifications can be made without departing from the concept of the invention. For instance, the arrangement described with reference to FIG. 4 in addition to allowing a conventional identity card or a short-term card to be used, may be modified, by excluding the signal connection (shown in broken lines) and instead either the conventional card, subsequent to manipulation of the control panel by the customer concerned, has written thereto certain information thereinto which permits withdrawal of gasoline from one of the pumps 491-494, or the customer's card will consist of a so-called "smart card", (i.e. a card which includes its own processor) on which the value of the transactions made are automatically deducted from a given allowable sum programmed on the card. The gasoline pump 491 in the FIG. 4 embodiment may be equipped with a card reader 4911, so that when a customer presents his/her card, which has previously been processed in the control panel 10 and the goods dispensing process therewith initiated (gasoline purchase), the customer is able to obtain the goods required (gasoline) even should the signal connection to the unit 4 be interrupted or perhaps has not been established.

We claim:

1. An arrangement for dispensing bank notes form a store of bank notes to a customer-accessible receipt opening, comprising:
   a card reader (15);
   a first keyboard (11) intended for insertion of the number of bank notes or the sum required; and a second keyboard (12) for the insertion of an individual code; CHARACTERIZED IN THAT the card reader (15), the first keyboard (11), the second keyboard (12) and the requisite control electronics are incorporated in a customer-operated panel (10) which is common to a cash dispenser (1) and to a goods vending machine (19), and in that the control panel includes a third keyboard (13) having at least two buttons (131, 132), a first button (131) being intended for activating the process for dispensing bank notes and the other button (132) being intended for initiating the process for the purchase of goods; the control panel being intended for activating a process for the dispensing of bank notes and/or a process for the purchase of goods in response to the manner of manipulation of the control panel (10) by the customer.

2. An arrangement according to claim 1, characterized in that the second keyboard (12) is placed close to the first keyboard (11) and the third keyboard (13), whereas a further keyboard (12') is positioned adjacent a dispensing location at the goods vending machine (19) of said goods; whereby upon customer identification via the card reader (15) and activation of said first button (131), the first keyboard (11) and the second keyboard (12), a bundle of bank notes is dispensed to a receipt opening of the cash dispenser (1); whereas upon customer identification via the card reader (15) and activation of the second button (132), the first keyboard (11) and the second keyboard (12') the goods required can be removed from the dispensing location at the goods vending machine.

3. An arrangement according to claim 2, in which the cash dispenser (1) is free-standing and connected to a location via a tube despatch system (80), characterized in that the control panel is placed in the cash dispenser (1) the store of bank notes and the bank-note outfeed means are placed in the location (81) and arranged for the automatic discharge of bank notes through the tube system (80) in response to signals from the control panel (10) upon activation of said panel by a customer.

4. An arrangement according to claim 3, characterized in that a goods vending machine (59) is located in the immediate vicinity of the cash dispenser (1) and in that a store of goods and goods feed means are arranged in the location (81) for automatic discharge of goods through the tube system (80) in response to signals from the control panel (10) upon manipulation of said panel by the customer.

5. An arrangement according to claim 2, in which the cash dispenser (1) is free-standing and connected to a location via a tube despatch system (80), characterized in that the control panel is placed in the cash dispenser (1) the store of bank notes and the bank-note outfeed means are placed in the location (81) and arranged for the automatic discharge of bank notes through the tube system (80) in response to signals from the control panel (10) upon activation of said panel by a customer.

6. An arrangement according to claim 5, characterized in that a goods vending machine (59) is located in the immediate vicinity of the cash dispenser (1) and in that a store of goods and goods feed means are arranged in the location (81) for automatic discharge of goods through the tube system (80) in response to signals from the control panel (10) upon manipulation of said panel by the customer.

7. An arrangement according to claim 1, characterized in that the goods vending machine (491) includes a card reader (4911) which is intended to read and therewith make possible the process for the dispensing of goods previously initiated by customer manipulation of the control panel (10).

8. An arrangement according to claim 1, characterized in that upon depression of the first button (131) of the third keyboard (13), the first keyboard (11) is intended to show on the buttons thereof different numbers of bank notes or different bank-note values; and in that upon depression of the second button (132) of the third keyboard (13), the first keyboard (11) is intended to show on the buttons thereof different types of goods or different qualities of goods.

9. A transaction arrangement comprising:
   a customer transaction unit including a customer-operatable panel unit, the panel unit including a card reader, first, second and third keyboards, said first keyboard including a plurality of selection keys for insertion of the number of bank notes or the sum required, the second keyboard being a numerical keyboard for entering the customer's personal code, the third keyboard including first and second selection keys for alternatively selecting one of first and second transaction functions, and a cash dispenser operable in response to a customer selecting said first transaction function via the third keyboard and entering customer and credit identification via the card reader and said second keyboard; and
   at least one goods vending apparatus coupled to said customer transaction unit and to said coupling and control means, said goods vending apparatus becoming operable in response to a customer selecting said second transaction function via the third keyboard and entering customer and credit identification via the card reader and said second keyboard.

10. A transaction arrangement according to claim 9, wherein the at least one goods vending apparatus is at least one gasoline pump.

11. A transaction arrangement according to claim 10, said at least one gasoline pump including a keyboard of the type of the second keyboard for entering the customer's personal code, and a card reader for verifying the customer's position at said pump and for activating said pump in response to the customer's selection of receiving gasoline from said at least one gasoline pump.

12. A transaction arrangement according to claim 10, wherein said at least one gasoline pump is a plurality of gasoline pumps.

13. A transaction arrangement according to claim 9, wherein the at least one goods vending apparatus is a foodstuff vending machine.

14. A transaction arrangement according to claim 13, wherein the foodstuff vending machine is disposed adjacent the transaction unit.

15. A transaction arrangement according to claim 9, wherein the first keyboard further comprises selectively activatable first indicia associated with designated ones of the keys of said first keyboard for selecting denominations of bank notes to be received from the cash dispenser upon completion of the first transaction function, and selectively activatable second indicia associated with designated ones of the keys of said first keyboard for selecting type of goods to be received from the goods vending apparatus upon completion of the second transaction function.

* * * * *